United States Patent
Choi (10) Patent No.: US 12,157,353 B2
(45) Date of Patent: Dec. 3, 2024

(54) PANEL DOOR FOR VEHICLE HAVING IMPROVED STIFFNESS

(71) Applicants: Hyundai Motor Company, Seoul (KR); Kia Corporation, Seoul (KR)

(72) Inventor: Je-Won Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/203,287

(22) Filed: May 30, 2023

(65) Prior Publication Data
US 2024/0066959 A1    Feb. 29, 2024

(30) Foreign Application Priority Data

Aug. 31, 2022    (KR) .................. 10-2022-0109728

(51) Int. Cl.
*B60J 5/04*      (2006.01)
(52) U.S. Cl.
CPC ........... *B60J 5/0443* (2013.01); *B60J 5/0413* (2013.01); *B60J 5/0415* (2013.01); *B60J 5/0423* (2013.01); *B60J 5/0437* (2013.01); *B60J 5/0455* (2013.01); *B60J 5/0469* (2013.01); *B60J 5/0481* (2013.01)
(58) Field of Classification Search
CPC ........ B60J 5/045; B60J 5/0443; B60J 5/0441; B60J 5/0481
See application file for complete search history.

(56) References Cited

U.S. PATENT DOCUMENTS

| | | | | |
|---|---|---|---|---|
| 7,607,716 B2* | 10/2009 | Buchta | ..................... | B60J 5/045 296/187.12 |
| 9,352,388 B2* | 5/2016 | Hu | ......................... | B22D 19/02 |
| 9,956,855 B2* | 5/2018 | Tamaoki | ................ | B60J 5/0416 |
| 10,358,105 B2* | 7/2019 | Suzuki | .................... | B60R 21/04 |
| 10,723,206 B2* | 7/2020 | Fischer | ................. | B60J 5/0418 |
| 11,065,944 B2* | 7/2021 | Jeon | ........................ | B60J 5/0406 |
| 2005/0093334 A1* | 5/2005 | Koa | ..................... | B60R 13/0815 296/146.5 |
| 2021/0283999 A1* | 9/2021 | Harney | ................... | B60J 5/107 |

FOREIGN PATENT DOCUMENTS

KR    10-2019-0055784 A    5/2019

* cited by examiner

*Primary Examiner* — Janet M Wilkens
*Assistant Examiner* — Susan M. Heschel
(74) *Attorney, Agent, or Firm* — Morgan, Lewis & Bockius LLP (57) ABSTRACT

A panel door applied for a vehicle including a stiffness member made of a plastic material and integrally formed on an internal surface of the panel door, includes an external panel, an internal panel coupled to the external panel, and a stiffness member formed to connect a frame forming a circumference and stiffness elements provided for reinforcing stiffness inside the frame and coupled to at least one of the external panel and the internal panel.

19 Claims, 10 Drawing Sheets

PANEL DOOR FOR VEHICLE HAVING IMPROVED STIFFNESS

CROSS-REFERENCE TO RELATED APPLICATION

The present application claims priority to Korean Patent Application No. 10-2022-0109728, filed on Aug. 31, 2022, the entire contents of which is incorporated herein for all purposes by this reference.

BACKGROUND OF THE PRESENT DISCLOSURE

Field of the Present Disclosure

The present disclosure relates to a panel door applied for a vehicle, and more particularly, to a panel door for a vehicle with improved stiffness in which a stiffness member is made of a plastic material and is integrally formed on an internal surface of the panel door.

Description of Related Art

Figure 1:
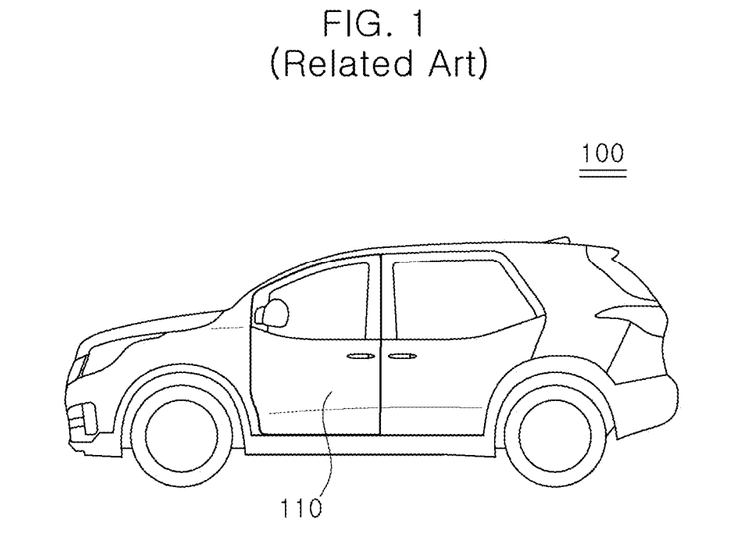
FIG. 1 is a side view showing a side surface of a vehicle according to the related art.

Typically, as shown in FIG. 1, a lateral side of a vehicle 100 is provided with a door 110 for passengers to get on or off.

Figure 2:
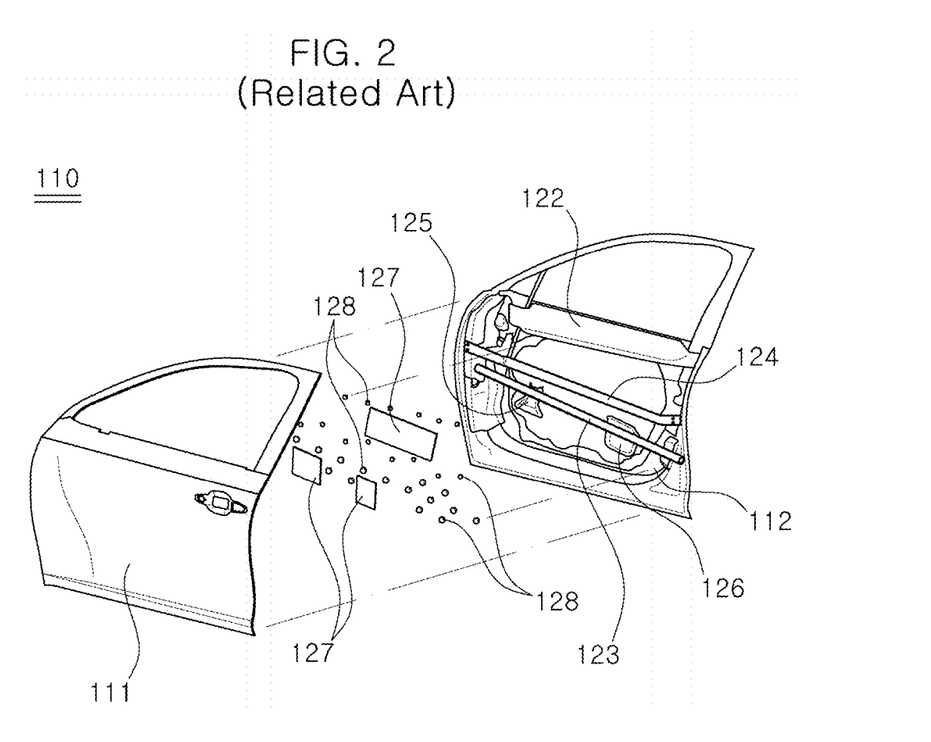
FIG. 2 is an exploded perspective view showing a state in which an external panel and an internal panel are assembled according to the related art.

The door 110 is constructed by coupling an external panel 111 and an internal panel 112. An out belt rail 122, an impact beam 123, and an upper member 124 are provided inside the external panel 111 and the internal panel 112 to increase a stiffness of the door 110.

An external bracket 125 and a push bracket 126 for fastening to the external panel 111 or the internal panel 112 are integrally provided to the impact beam 123.

A body panel reinforcement (BPR) sealer 127 applied and then cured to assist the stiffness is applied to an internal surface of the external panel 111, and a mastic sealer 128 applied and then cured is applied to a portion where the external panel 111 or the internal panel 112 is overlapped with other member.

The door 110 is typically manufactured by processing a metal plate in which the external panel 111 and the internal panel 112 are formed using a press mold, and then circumferences of the external panel 111 and the internal panel 112 are finished through a hemming processing.

However, the external panel 111 and the internal panel 112 are processed through a large press using a mold, which is suitable for mass production, but there is a problem in that when diversified small-quantity production vehicle models, such as a purpose built vehicle (PBV), are developed, it takes a lot of time and cost to develop the vehicle model.

To manufacture a new mold for the external panel 111 and the internal panel 112, it requires a lot of time and cost, and to recover such the time and cost, the same vehicle model needs to be mass-produced. Therefore, it needs to re-manufacture a mold of the external panel 111 and the internal panel 112 for each vehicle model in the diversified small-quantity production vehicle model, which causes an increase in a production cost. Furthermore, there is a problem in that a new mold needs to be developed even when a minor design change of the door 110 is requested.

To solve these problems, any one of the external panel 111 and the internal panel 112 has been provided as a plastic panel manufactured through an injection molding. Therefore, it is possible to reduce a mold investment cost, a development period, and number of components of the panel, responding to needs of the diversified small-quantity production.

For example, when the external panel 111 is provided as a plastic panel, there is a problem in that it is not easy to reinforce the stiffness of the external panel 111. The plastic panel includes a weaker stiffness than a metal panel, and therefore a new reinforcement member needs to be added for each weak portion or the thickness of the external panel 111 needs to be increased, which causes an increase in weight and cost, resulting in offsetting the advantage obtained by applying the plastic panel.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door for a vehicle including a plurality of panel members and stiffness members (referred to as "a panel door" hereinafter), in which a light-weight plastic panel is applied to a panel member forming a door and a stiffness member is integrally formed with an internal surface of the panel member, achieving a weight loss and providing a predetermined stiffness.

a panel door for a vehicle with improved stiffness according to an exemplary embodiment of the present disclosure may include an external panel, an internal panel coupled to the external panel, and a stiffness member formed to connect a frame forming a circumference of the stiffness member and stiffness elements provided for reinforcing stiffness inside the frame and coupled to at least one of the external panel and the internal panel.

The external panel may be formed as a plastic panel, the internal panel may be formed as a metal panel, and the stiffness member may be coupled to be integrated with the external panel.

The stiffness member may include a frame formed along a circumference of the stiffness member, a main stiffness element formed to include first and second end portions connected to the frame or formed along the frame, an auxiliary stiffness element formed on the main stiffness element or formed to be connected to the main stiffness element, and a bridge connecting the auxiliary stiffness element and the main stiffness element or connecting the auxiliary stiffness elements spaced from each other, and the frame, the main stiffness element, the auxiliary stiffness element, and the bridge may be integrally formed.

The main stiffness element may be an out belt rail portion formed on an upper end portion of the frame in a longitudinal direction of the vehicle.

The main stiffness element may be an impact beam portion including each of the first and second end portions connected to the frame below the out belt rail portion.

The main stiffness element may be an upper member portion including first and second end portions, each of which is connected to the frame between the out belt rail portion and the impact beam portion.

The impact beam portion and the upper member portion may be disposed to include a smaller interval toward a front direction of the vehicle.

The auxiliary stiffness element may be an external bracket portion and a push bracket portion formed to have greater widths than a width of the impact beam portion on the impact beam portion and including intervals therebetween.

The auxiliary stiffness element may become a first lower reinforcement portion and a second lower reinforcement portion each disposed in a front and rear direction of the vehicle and formed to have predetermined areas, and each of the first lower reinforcement portion and the second lower reinforcement portion may be connected to the impact beam portion by the bridge.

Each of the first lower reinforcement portion and the second lower reinforcement portion may be connected to the external bracket portion by the bridge.

The auxiliary stiffness element may become an upper reinforcement portion formed to include a predetermined area between the out belt rail portion and the upper member portion, and the upper reinforcement portion may be connected to each of the out belt rail portion and the upper member portion by the bridge.

A vibration damping material for absorbing an impact may be provided between the stiffness element and the external panel.

The vibration damping material may be applied or attached to a surface of the stiffness element.

The vibration damping material may be provided on the auxiliary stiffness element.

The frame may be formed along the circumference of the stiffness member, and the stiffness element may be a reinforcement rib, first and second end portions of which are connected to the frame at an interval inside the frame.

The reinforcement ribs may be disposed in different directions from each other and formed to cross each other.

The stiffness member may be attached to the internal surface of the external panel by an adhesive or by thermal fusion.

A coupling protrusion may be protruded from any one side of the external panel and the frame, and a coupling hole into which the coupling protrusion is inserted may be formed in the other side of the external panel and the frame. The coupling protrusion may be fitted into the coupling hole, and thus the external panel and the stiffness member are coupled to each other.

A through hole may be formed in any one side of the external panel and the frame, and a fastening groove may be formed in the other side of the external panel and the frame. A fastening bolt may pass through the through hole and then be fastened to the fastening groove, and thus the external panel and the stiffness member are fastened to each other.

The external panel may be formed as a plastic panel, the internal panel may be formed as a metal panel, and the stiffness member may be injected integrally with the external panel when the external panel is formed by injection.

According to the panel door for a vehicle with improved stiffness according to an exemplary embodiment of the present disclosure including the above configuration, it is possible to provide the external panel of the external panel and the internal panel forming the door as the plastic panel, reducing the weight of the door and saving the mold investment cost and the development time.

Furthermore, by fastening the stiffness member to the external panel, it is possible to resolve the stiffness reduction problem which may be caused by applying the plastic material.

Furthermore, because the stiffness member is fastened to and formed with the external panel or formed integrally with the external panel by an injection molding, a separate stiffness member is not required, reducing the assembling process.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a panel door for a vehicle with improved stiffness according to an exemplary embodiment of the present disclosure will be described in detail with reference to the accompanying drawings.

Figure 3:
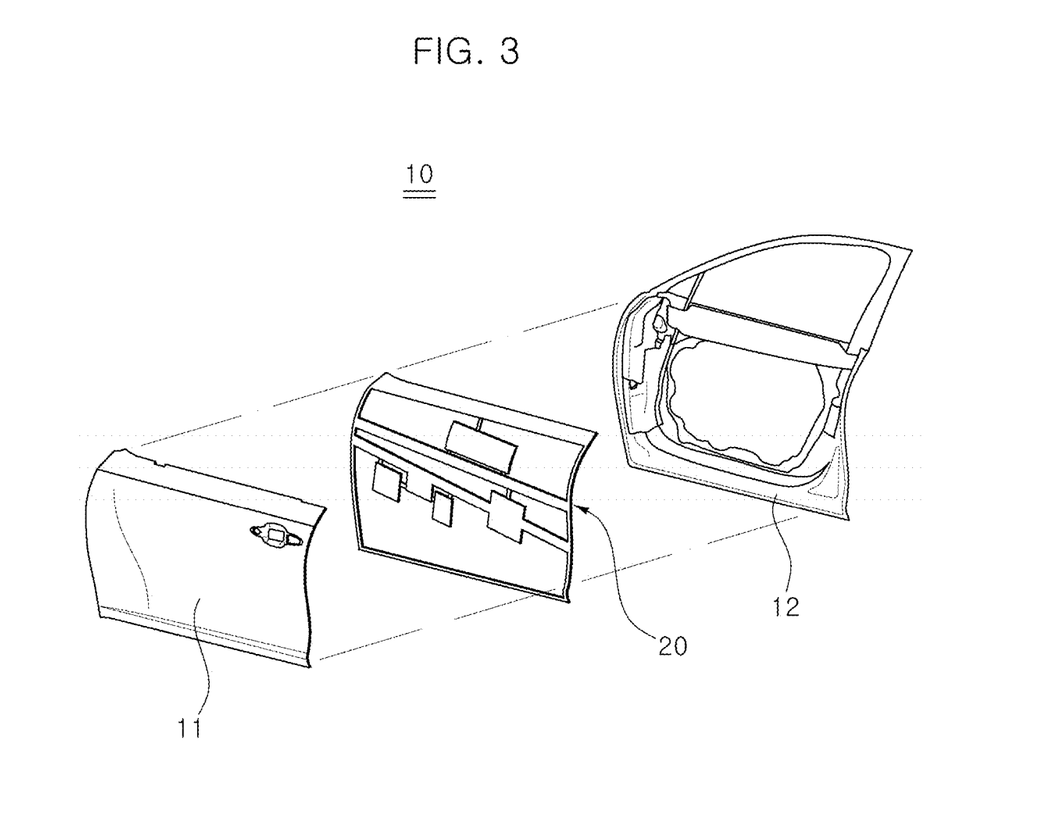
FIG. 3 is an exploded perspective view showing a panel door for a vehicle with improved stiffness according to an exemplary embodiment of the present disclosure.

A panel door 10 for a vehicle with improved stiffness according to an exemplary embodiment of the present disclosure may include an external panel 11, an internal panel 12 coupled to the external panel 11, and a stiffness member 20 in which a frame 21 forming a circumference thereof and stiffness elements provided for reinforcing stiffness are connected to each other inside the frame 21 while coupled to any one of the external panel 11 and the internal panel 12.

The external panel 11 may form an external surface of the door 10.

The internal panel 12 may form an internal surface of the door 10. The internal panel 12 may be coupled to the external panel 11 to form the door 10.

Any one of the external panel 11 and the internal panel 12 may be provided as a plastic panel, and the other may be provided as a metal panel. In other words, the external panel 11 may be formed as the plastic panel, and the internal panel 12 may be formed as a metal panel, reducing the weight of the door 10. Because the external panel 11 is provided as the plastic panel, it is possible to easily respond to a design change of the door 10.

Meanwhile, the stiffness member 20 for reinforcing the stiffness of the door 10 may be provided between the external panel 11 and the internal panel 12.

Conventionally, to reinforce stiffness, an impact beam, an external belt rail, an upper member, and the like have been individually fastened to the internal panel, and a body panel reinforcement (BPR) sealer or a mastic sealer has been applied and then cured in the assembly process to provide stiffness.

However, in an exemplary embodiment of the present disclosure, the stiffness member 20 in which elements for reinforcing stiffness are integrally formed may be disposed between the external panel 11 and the internal panel 12.

Figure 5:
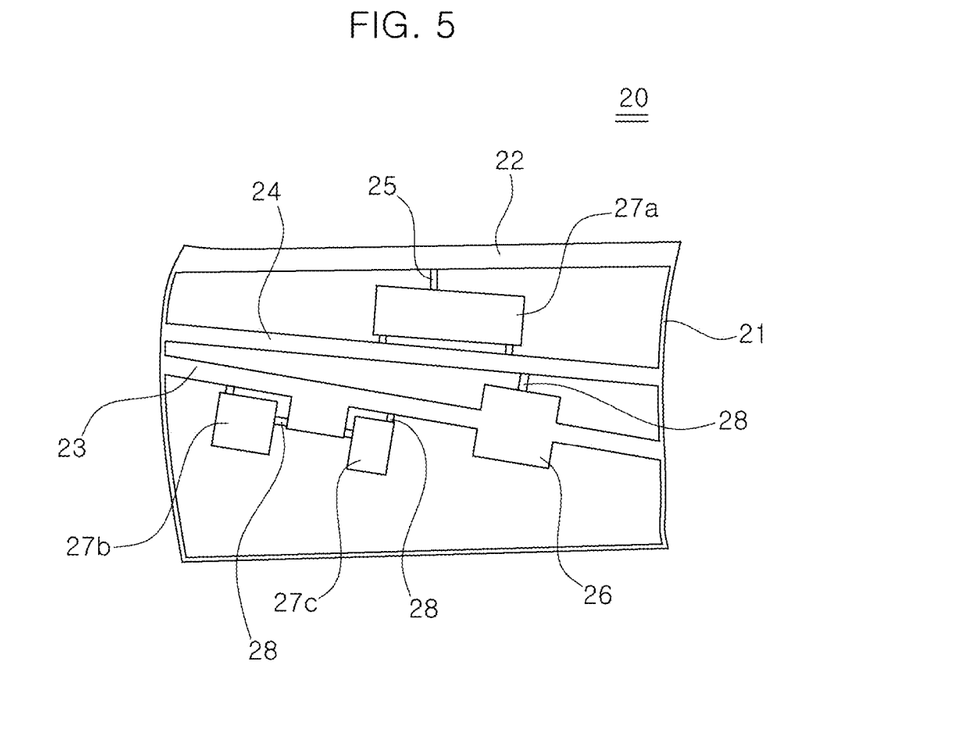
FIG. 5 is a front view of the stiffness member applied to the panel door for a vehicle with improved stiffness according to an exemplary embodiment of the present disclosure.

The stiffness member 20 may include a main stiffness element and an auxiliary stiffness element with predetermined thicknesses which are arranged at a portion where elements for reinforcing the stiffness are applied in the conventional door. The main stiffness element and the auxiliary stiffness element replace the elements for reinforcing the stiffness in the conventional door, enhancing the stiffness of the door 10.

The stiffness member 20 may be formed to connect a frame 21 forming a circumference thereof and the stiffness element, that is, the main stiffness element and the auxiliary stiffness element, which are provided for reinforcing the stiffness inside the frame 21.

The stiffness member 20 may be made of a plastic material and manufactured by an injection molding. Because the stiffness member 20 is to reinforce the stiffness of the door 10, the stiffness member 20 may be made of a plastic material having a greater stiffness than that of the external panel 11. For example, the stiffness member 20 may become an engineering plastic. Alternatively, the stiffness member 20 may be made of a plastic reinforced with a glass fiber, a carbon fiber reinforced plastic (CFRP) reinforced with a carbon fiber, a sheet molding compound (SMC), or the like.

The frame 21 may be formed along the circumference of the stiffness member 20.

Both end portions of the main stiffness element may be connected to the frame 21 or formed along the frame 21 to reinforce the stiffness.

The main stiffness element may include an out belt rail portion 22, an impact beam portion 23, or an upper member portion 24.

The out belt rail portion 22 may be formed on an upper end portion of the frame 21 in a longitudinal direction of the vehicle. Because the out belt rail portion 22 is formed on the upper end portion of the frame 21 in a predetermined width and thickness, the stiffness of the upper end portion of the door 10 may be reinforced. In other words, the out belt rail portion 22 may replace the out belt rail in the conventional door to reinforce the stiffness of the door 10.

Each of a front end portion and a rear end portion of the impact beam portion 23 may be connected to the frame below the out belt rail portion 22. The impact beam portion 23 may be formed in a predetermined width and thickness to reinforce the stiffness of the door 10 below the out belt rail portion 22. The impact beam portion 23 replaces the impact beam in the conventional door to reinforce the stiffness of the door 10. Meanwhile, the impact beam portion 23 may be formed to be inclined downward toward the rear of the vehicle.

Each of a front end portion and a rear end portion of the upper member portion 24 may be connected to the frame between the out belt rail portion 22 and the impact beam portion 23. The upper member portion 24 may be positioned between the out belt rail portion 22 and the impact beam portion 23 to reinforce the stiffness of a side surface of the door 10. The upper member portion 24 may replace the upper member in the conventional door. The upper member portion 24 may be disposed to be inclined downward, and an angle of the upper member portion 24 may be smaller than that of the impact beam portion 23. Therefore, the impact beam portion 23 and the upper member portion 24 may be disposed so that a distance therebetween becomes smaller toward the front direction of the vehicle.

The auxiliary stiffness element may be formed on the main stiffness element or formed to be connected to the main stiffness element to further reinforce the stiffness.

In the conventional door, an external bracket portion and a push bracket portion are integrally formed on an impact beam, and correspondingly, in an exemplary embodiment of the present disclosure an external bracket portion 25 and a push bracket portion 26 are formed on the impact beam portion 23. The external bracket portion 25 and the push bracket portion 26 allow a middle portion of the impact beam portion 23 to be in contact with the external panel 11 so that the internal surface of the external panel 11 may be supported to the impact beam portion 23.

Furthermore, as the auxiliary stiffness element, an upper reinforcement portion 27a formed between the out belt rail portion 22 and the upper member portion 24 may be applied.

Furthermore, each of a first lower reinforcement portion 27b and a second lower reinforcement portion 27c disposed below the impact beam portion 23 in a front and rear direction of the vehicle may also become the auxiliary stiffness element. The upper reinforcement portion 27a, the first lower reinforcement portion 27b, and the second lower reinforcement portion 27c may replace the BPR sealer in the portion where the BPR sealer has been applied in the conventional door and may be formed to have constant areas to support the internal surface of the external panel 11.

A bridge 28 may be formed to connect the auxiliary stiffness element to the main stiffness element or connect the auxiliary stiffness element to another adjacent to auxiliary stiffness element. Because the bridge 28 does not provide a stiffness, the bridge 28 may be formed to have a smaller width and a thickness than those of the other portions.

For example, the upper reinforcement portion 27a may be connected to the out belt rail portion 22 and the upper member portion 24 by the bridge 28, and the first lower reinforcement portion 27b and the second lower reinforcement portion 27c may be connected to the impact beam portion 23 and the external bracket portion 25 by the bridge 28. Furthermore, the push bracket portion 26 may be connected to the upper member portion 24 by the bridge 28.

The frame 21, the main stiffness element, the auxiliary stiffness element, and the bridge 28 may be integrally formed.

The stiffness member 20 may be coupled to any one of the external panel 11 and the internal panel 12, the external panel 11 formed as the plastic panel.

Figure 4:
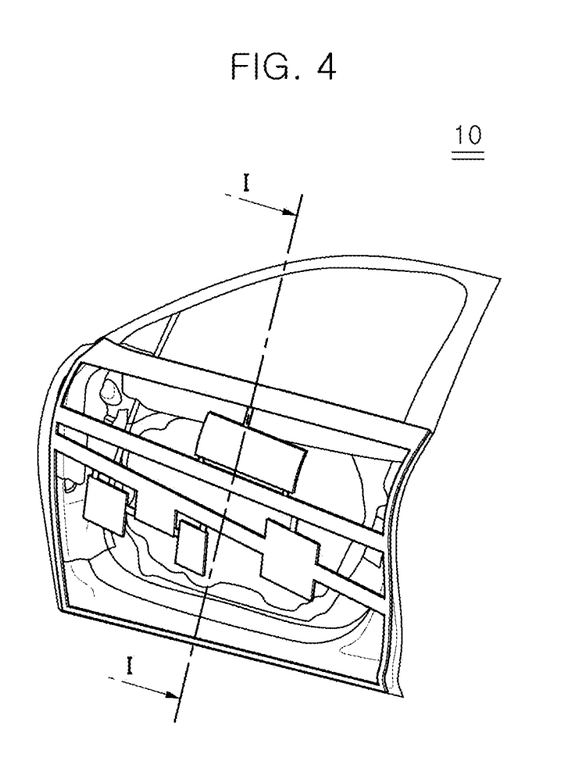
FIG. 4 is a perspective view showing a state in which a stiffness member and the internal panel are coupled in the panel door for a vehicle with improved stiffness according to an exemplary embodiment of the present disclosure.

The stiffness member 20 may be preferentially coupled to the external panel 11. The door 10 may be formed by coupling the external panel 11, the stiffness member 20, and the internal panel 12, in which the external panel 11 and the internal panel 12 may be first assembled, and then the internal panel 12 may be coupled to the assembled structure.

A front surface of the stiffness member 20 may be applied with an adhesive and bonded and integrated with the internal surface of the external panel 11.

Alternatively, the external surface of the stiffness member 20 and the internal surface of the external panel 11 may be bonded to each other and integrated by thermal fusion.

Furthermore, when the stiffness member 20 is coupled to the external panel 11, a mechanical method may be applied.

Figure 6:
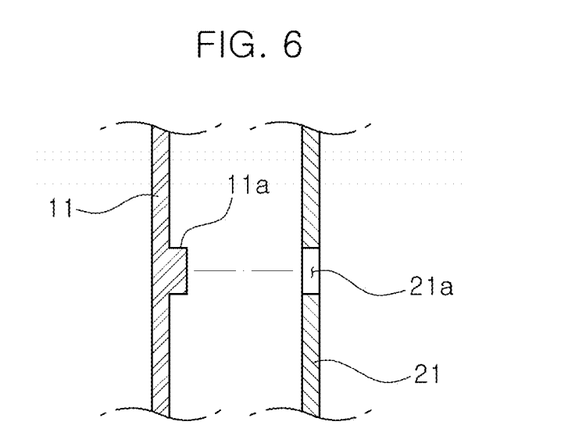
FIG. 6 is a cross-sectional view showing an example of a method of fastening the stiffness member to the external panel in the panel door for a vehicle with improved stiffness according to an exemplary embodiment of the present disclosure.

In other words, as shown in FIG. 6, the external panel 11 and the stiffness member 20 may be assembled by a coupling protrusion 11a-coupling hole 21a structure. The coupling protrusion 11a may protrude from any one side of the external panel 11 and the frame 21, the coupling hole 21a into which the coupling protrusion 11a is inserted may be formed on the other side of the external panel 11 and the frame 21, in which the coupling protrusion 11a may be fitted into the coupling hole 21a, and thus the external panel 11 and the stiffness member 20 are assembled with each other. FIG. 6 illustrates an example that the coupling protrusion 11a is formed on the external panel 11, and the coupling hole 21a is formed in the frame 21.

Figure 7:
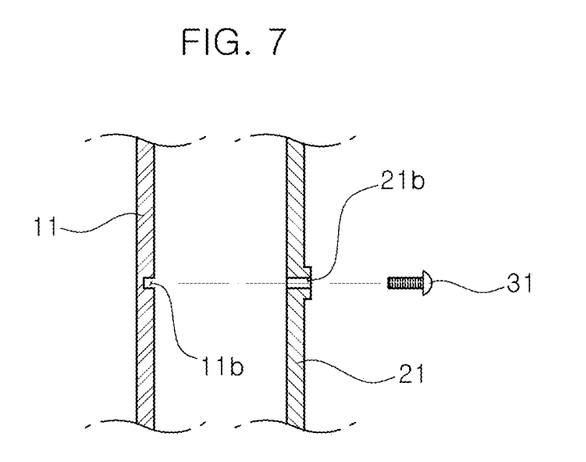
FIG. 7 is a cross-sectional view showing another example of a method of fastening the stiffness member to the external panel in the panel door for a vehicle with improved stiffness according to an exemplary embodiment of the present disclosure.
Figure 8:
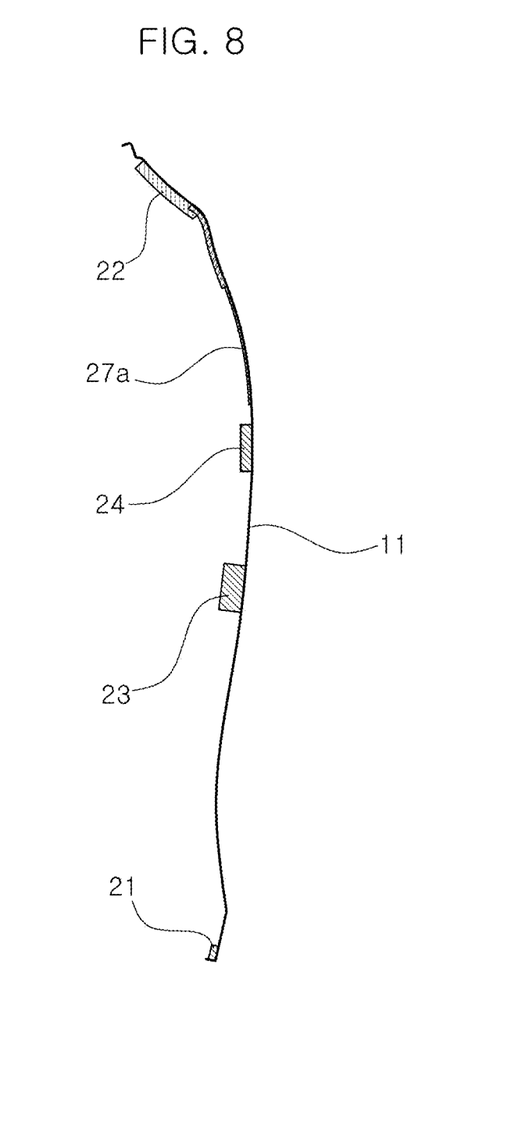
FIG. 8 is a cross-sectional view along line I-I in FIG. 4.

Furthermore, as shown in FIG. 7, the external panel 11 and the stiffness member 20 may be coupled using a fastening bolt 31. A through hole 21b may be formed in any one side of the external panel 11 and the frame 21, and a fastening groove 11b may be formed in the other side of the external panel 11 and the frame 21, and thus the fastening bolt 31 may pass through the through hole 21b and may be fastened to the fastening groove 11b. FIG. 7 shows an example in which the through hole 21b is formed in the frame 21 and the fastening groove 11b is formed in the external panel 11.

A coupling method of coupling the external panel 11 and the stiffness member 20 using the coupling protrusion 11a and the coupling hole 21a or using the fastening bolt 31 as described in the above may be applied at an interval to the circumference of the stiffness member 20.

Figure 10A:
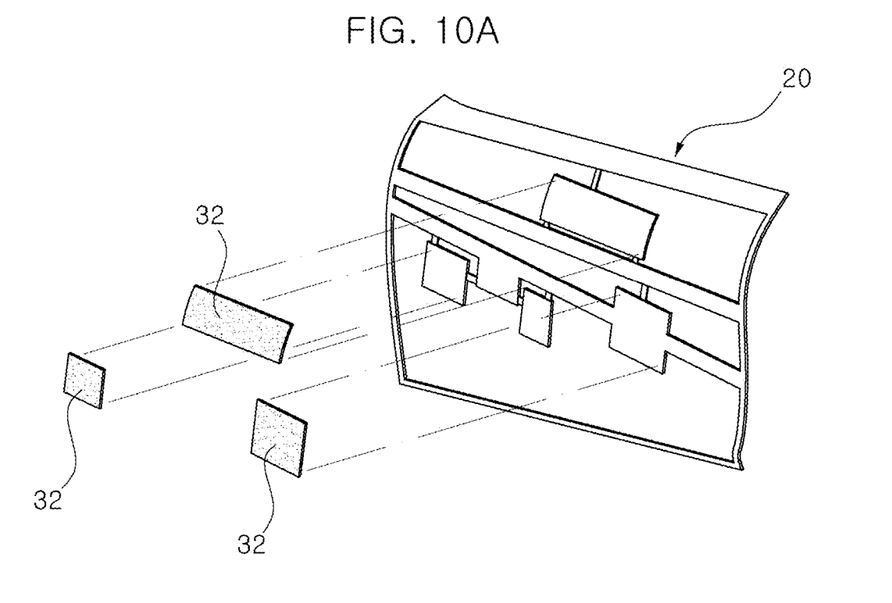
FIG. 10A is an exploded perspective view showing an example in which a vibration damping material is applied to the stiffness member of the panel door for a vehicle with improved stiffness according to an exemplary embodiment of the present disclosure.
Figure 10B:
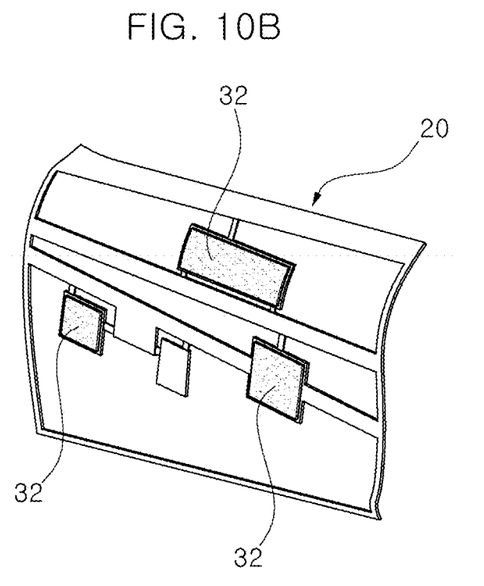
FIG. 10B is a perspective view showing an example in which the vibration damping material is applied to the stiffness member of the panel door for a vehicle with improved stiffness according to an exemplary embodiment of the present disclosure.
Figure 10C:
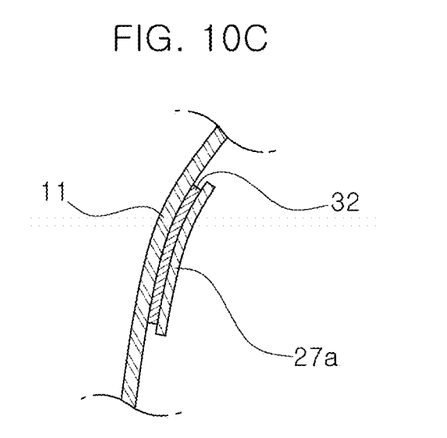
FIG. 10C is a cross-sectional view of a portion where the vibration damping material is applied to the stiffness member in the panel door for a vehicle with improved stiffness according to an exemplary embodiment of the present disclosure.

A vibration damping material 32 is provided between the stiffness member 20 and the external panel 11.

When the vehicle travels, the external panel 11 may vibrate, or when the door 10 is opened or closed, the external panel 11 may collide with the stiffness member 20 to generate a noise, and the vibration damping material 32 may absorb such the vibration and the noise.

The vibration damping material 32 may also be applied to the entire portion of the stiffness member 20, but is applied locally to the stiffness member 20. In other words, the vibration damping material 32 may be applied to some of the main stiffness elements or the auxiliary stiffness elements. For example, as shown in FIG. 10A and FIG. 10B, the vibration damping material 32, which is the auxiliary stiffness element, may be applied to the upper reinforcement portion 27a, the first lower reinforcement portion 27b, and the push bracket portion 26.

The vibration damping material 32 may be made of a urethane material and applied to the upper reinforcement portion 27a, the first lower reinforcement portion 27b, the push bracket portion 26, and the like, which allows the external panel 11 and the stiffness member 20 to be in close contact with each other and to absorb an impact, suppressing a generation of vibrations and noises.

The vibration damping material 32 may be provided in a form of a tape and attached to the upper reinforcement portion 27a, the first lower reinforcement portion 27b, and the push bracket portion 26.

Alternatively, the vibration damping material 32 may be provided in a liquid form, which is applied and then cured, and may be applied to the upper reinforcement portion 27a, the first lower reinforcement portion 27b, and the push bracket portion 26.

Figure 9:
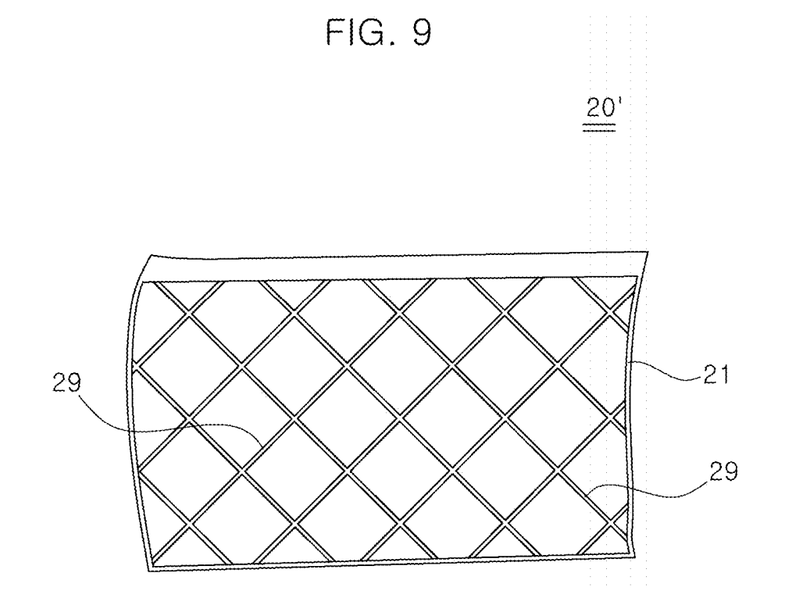
FIG. 9 is a front view showing a stiffness member applied to a panel door for a vehicle with improved stiffness according to another exemplary embodiment of the present disclosure.

Meanwhile, FIG. 9 shows another exemplary embodiment of the present disclosure.

As the above-described embodiment, a stiffness member 20' may be provided between the external panel 11 made of the plastic material and the internal panel 12 made of the metal material. The stiffness member 20' may include a different shape from the stiffness member 20 in the above-described embodiment.

In the above-described embodiment, the main stiffness element and the auxiliary stiffness element are provided in the portion where a reinforcement is required, but in the instant embodiment, it is possible to uniformly increase the stiffness over the entire region of the stiffness member 20'.

The stiffness member 20' allows the frame 21 and a reinforcement rib 29 to become the stiffness element where the reinforcement rib 29 is disposed at an interval inside the frame 21 and opposite end portions the reinforcement rib 29 are connected to the frame 21, respectively.

The frame 21 may form a circumference of the stiffness member 20' as in the above-described embodiment.

In an exemplary embodiment of the present disclosure, the reinforcement ribs 29 formed at intervals inside the frame 21 is configured as a stiffness element. Each of both end portions of the reinforcement rib 29 is connected to the frame 21, and each reinforcement rib 29 is disposed at an interval from an adjacent reinforcement rib 29. Furthermore, each of the reinforcement ribs 29 may be disposed in different directions from each other and formed to cross each other.

For example, as shown in FIG. 9, each of the reinforcement ribs 29 disposed in different directions may be disposed in an X shape and connected to the frame 21.

Alternatively, each of the reinforcement ribs 29 may be disposed in a longitudinal direction and a height direction of the vehicle, and both end portions of each of the reinforcement ribs 29 may be bonded to the frame 21.

Therefore, the reinforcement rib 29 allows the internal panel 12 to be coupled after the stiffness member 20' including the reinforcement rib 29 is coupled to the internal surface of the external panel 11.

Figure 11:
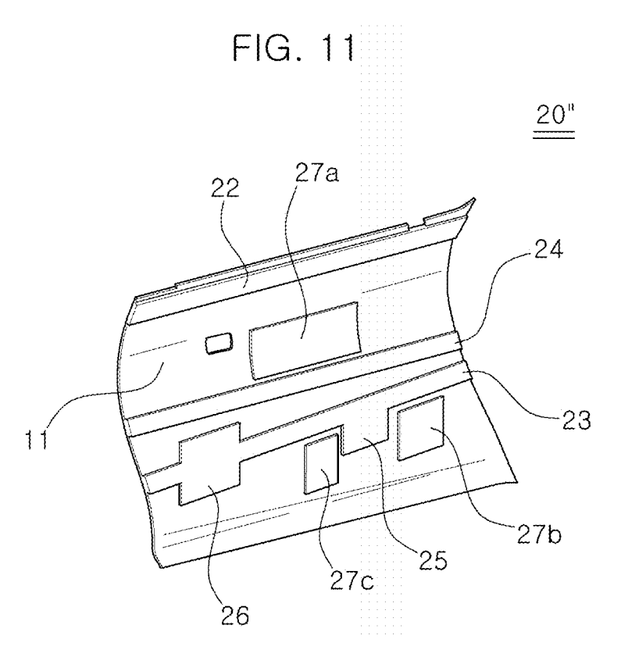
FIG. 11 is a perspective view showing a state in which an external panel and a stiffness member are integrally formed in a panel door for a vehicle with improved stiffness according to various exemplary embodiments of the present disclosure.

FIG. 11 shows various exemplary embodiments of the present disclosure.

In the exemplary embodiment shown in FIG. 11, when the external panel 11 is formed, a stiffness member 20" may be injection-molded together with the external panel 11.

In other words, because the external panel 11 includes a plastic material and formed by the injection molding and the stiffness member 20" is also made of the plastic material and formed by the injection molding, the stiffness member 20" is injection-molded together when the external panel 11 is molded.

When the external panel 11 is molded, a portion where a main stiffness element or an auxiliary stiffness member of the stiffness member 20" is formed may be molded to have an increased thickness, and thus the external panel 11 and the stiffness member 20" may be molded integrally.

However, in the instant embodiment, because the external panel 11 and the main stiffness element and the auxiliary stiffness element forming the stiffness member 20" are injection-molded together, the main stiffness element and the auxiliary stiffness element may be made of the same material as the external panel 11.

Meanwhile, in the instant embodiment, because the auxiliary stiffness element is connected to the main stiffness element or another auxiliary stiffness element through the external panel 11, a bridge as shown in FIG. 5 does not need to be connected.

As described above, the external panel 11 into which the stiffness member 20" is integrated may be coupled to the internal panel 12 made of the metal material to form the door 10.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A panel door for a vehicle with improved stiffness, the panel door comprising:
   an external panel;
   an internal panel coupled to the external panel; and
   a stiffness member formed to connect a frame forming a circumference of the stiffness member and stiffness elements provided for reinforcing stiffness inside the frame and coupled to at least one of the external panel and the internal panel,
   wherein a coupling protrusion protrudes from one of the external panel and the frame,
   wherein a coupling hole into which the coupling protrusion is inserted is formed in another of the external panel and the frame, and
   wherein the coupling protrusion is fitted into the coupling hole, and thus the external panel and the stiffness member are coupled to each other.

2. The panel door of claim 1,
   wherein the external panel is formed as a plastic panel,
   wherein the internal panel is formed as a metal panel, and
   wherein the stiffness member is coupled to be integrated with the external panel.

3. The panel door of claim 2, wherein the stiffness member is attached to an internal surface of the external panel by an adhesive or by thermal fusion.

4. The panel door of claim 1, wherein the stiffness member includes:
   the frame formed along the circumference of the stiffness member;
   a main stiffness element formed to include first and second end portions connected to the frame or formed along the frame;
   an auxiliary stiffness element formed on the main stiffness element or formed to be connected to the main stiffness element; and
   a bridge connecting the auxiliary stiffness element and the main stiffness element or connecting the auxiliary stiffness elements spaced from each other,
   wherein the frame, the main stiffness element, the auxiliary stiffness element, and the bridge are integrally formed.

5. The panel door of claim 4, wherein the main stiffness element is an out belt rail portion formed on an upper end portion of the frame in a longitudinal direction of the vehicle.

6. The panel door of claim 5, wherein the main stiffness element is an impact beam portion including each of the first and second end portions connected to the frame below the out belt rail portion.

7. The panel door of claim 6, wherein the main stiffness element is an upper member portion including first and second end portions, each of which is connected to the frame between the out belt rail portion and the impact beam portion.

8. The panel door of claim 7, wherein the impact beam portion and the upper member portion are disposed to include a smaller interval toward a front direction of the vehicle.

9. The panel door of claim 7,
wherein the auxiliary stiffness element includes an upper reinforcement portion formed to include a predetermined area between the out belt rail portion and the upper member portion, and
wherein the upper reinforcement portion is connected to each of the out belt rail portion and the upper member portion by the bridge.

10. The panel door of claim 6, wherein the auxiliary stiffness element includes an external bracket portion and a push bracket portion formed to have greater widths than a width of the impact beam portion on the impact beam portion and including intervals therebetween.

11. The panel door of claim 10,
wherein the auxiliary stiffness element includes a first lower reinforcement portion disposed in a front or rear direction of the vehicle and a second lower reinforcement portion disposed in an opposite direction of the first lower reinforcement portion, and the first and second lower reinforcement portions are formed to have predetermined areas, and
wherein each of the first lower reinforcement portion and the second lower reinforcement portion is connected to the impact beam portion by the bridge.

12. The panel door of claim 11, wherein each of the first lower reinforcement portion and the second lower reinforcement portion is connected to the external bracket portion by the bridge.

13. The panel door of claim 4, wherein a vibration damping material for absorbing an impact is provided between the stiffness element and the external panel.

14. The panel door of claim 13, wherein the vibration damping material is applied or attached to a surface of the stiffness element.

15. The panel door of claim 13, wherein the vibration damping material is provided on the auxiliary stiffness element.

16. The panel door of claim 1, wherein the stiffness element includes a plurality of reinforcement ribs, and first and second end portions of the plurality of reinforcement ribs are connected to the frame at an interval inside the frame.

17. The panel door of claim 16, wherein the plurality of reinforcement ribs is disposed in different directions from each other and formed to cross each other.

18. The panel door of claim 1,
wherein the external panel is formed as a plastic panel,
wherein the internal panel is formed as a metal panel, and
wherein the stiffness member is injected integrally with the external panel when the external panel is injected.

19. A panel door for a vehicle with improved stiffness, the panel door comprising:
an external panel;
an internal panel coupled to the external panel; and
a stiffness member formed to connect a frame forming a circumference of the stiffness member and stiffness elements provided for reinforcing stiffness inside the frame and coupled to at least one of the external panel and the internal panel,
wherein a through hole is formed in one of the external panel and the frame,
wherein a fastening groove is formed in another of the external panel and the frame, and
wherein a fastening bolt passes through the through hole and is fastened to the fastening groove and thus the external panel and the stiffness member are fastened to each other.

* * * * *